United States Patent Office 3,558,676
Patented Jan. 26, 1971

3,558,676
FATTY ACID CHROMIUM COMPLEX SALTS AND COMPOSITIONS THEREOF
Edward E. Doherty, P.O. Box 2332,
Buford, Ga. 30518
No Drawing. Filed Apr. 19, 1967, Ser. No. 631,851
Int. Cl. C07c *143/90;* C11d *1/28*
U.S. Cl. 260—400          13 Claims

ABSTRACT OF THE DISCLOSURE

This invention is a method for producing a water repelling composition comprising reacting a fatty acid metallic salt with basic chromic sulphate and the composition itself.

BACKGROUND

This invention relates to compounds for use in treating various materials to render them water resistant or repellent. More particularly, this invention relates to a fatty acid chromium complex salt for use in impregnating and coating various materials to render them water resistant or repellent and to the method for producing such compounds.

The art of rendering materials water resistant or repellent by impregnation and coating with hydrophobic compounds is old and well known. However, many of the prior art compounds and compositions are quite expensive and are not of a permanent nature. For example, in many instances when a material has been treated with a prior art hydrophobic compound the compound will be easily removed after several washings or dry cleanings. This is particularly prevalent with fabrics and necessitates their being periodically retreated. Moreover, certain of these hydrophobic compounds will impart water resistance or repellency only to certain materials and thus have but limited use. In addition, some of these compounds produce a resistance to dyeing thereby creating certain disadvantages when used to treat textile materials.

BRIEF DESCRIPTION OF THE INVENTION

In accordance with this invention, there is provided a compound comprising a fatty acid chromium complex salt for use in treating various materials to render them permanently water repellent and resistant. A method of producing this compound is also provided and generally comprises reacting a metallic salt of a fatty acid with basic chromic sulphate.

As previously mentioned, the primary use of this compound is in treating porous materials to render them water resistant and repellent. The treatment may include the usual impregnation and coating techniques presently practiced in the art. The results of the treatment produce a resistance to water which is of a substantially permanent nature. The apparent reason for this is that the compound, upon drying, becomes highly insoluble in water as well as insoluble in conventional hydrocarbon solvents which are used in the dry cleaning industry and around the home.

It is, therefore, a primary object of this invention to provide a new compound for use in treating various materials to render them water resistant and repellent.

Another object of this invention is to provide a method for producing a new compound for use in treating various materials to render them water resistant and repellent.

A further object of this invention is to provide a fatty acid chromium complex salt for use in treating porous materials to render them water resistant and repellent.

Another object of this invention is to provide a method of making a fatty acid chromium complex salt.

Another object of this invention is to provide a fatty acid chromic sulphate complex for use in imparting substantially permanent water resistance to porous materials.

Other objects and features of this invention will become apparent from the following detailed description and the accompanying examples.

The fatty acid chromium complex salts of this invention are coordination compounds of the Werner type. According to the Werner Theory, atoms may exert auxiliary or secondary valences as well as the principal or primary valences occurring in simple compounds. Even though the primary valence-combining capacity of such atoms may become exhausted, the atoms may still combine with other atoms, radicals, or molecules by means of the secondary valences. The central atom which exerts both primary and secondary valences together with its coordinated group or groups is referred to as a complex and functions as a unit.

With particular reference to chromium, it has been found that the total number of groups which may be held within the complex by the primary and secondary valences is six. Other groups may also be associated with the chromium, but when this occurs, such additional groups are present as ions and are outside of the chromium nucleus complex.

In general, the fatty acid chromium complex salts of this invention are fatty acid chromic sulphate complexes and may be formed by reacting a metallic salt of a fatty acid with basic chromic sulphate.

Various fatty acids may be used in the formation of the chromic sulphate complex of this invention. Some of them are stearic acid, oleic acid, linoleic acid, cod liver oil fatty acids, decanoic acid, etc. The acids may be saturated or unsaturated. The saturation does not have an effect on the complex formation, but does have an effect on the color, the hardness of complex, and after effects such as polymerization, etc. These acids are long chain hydrocarbons compounds containing at least 10 carbon atoms and up to and about 25 carbon atoms.

These various fatty acids are reacted with basic metal compounds to produce the metal salt of the fatty acid. The basic metals are of the alkali metal series.

The basic chromic sulphate, with which the hereinbefore defined metal salt of the fatty acid is reacted, may be purchased on the commercial market, or it may be produced by the reduction of sodium dichromate with sulfur dioxide and also by the reduction of sodium dichromate with either sucrose or dextrose in the presence of sulfuric acid.

The basicity of the chromic sulphate can range from zero to that degree which will leave enough sulphate present in the complex equal to the sulphate displaced by the fatty acid radical to form our complex compound plus the minimum amount of sulphate necessary to have a complex compound. Varying basicities may be used so long as they do not interfere with the reaction of the fatty acid salt and the basic chromic sulphate. The percentage of basicity of the chromic sulphate may be defined as a measure of the extent to which hydroxyl ions have replaced the anions of the acid group of the chromic sulphate. For example, chromic sulphate hexahydrate is a chromic salt of the diabasic acid, sulfuric acid, having 0 percent basicity. When the hydroxyl group replaces one of the $SO_4$ radicals, a basic salt, $Cr_2(OH)_2(SO_4)_2$, is formed and since one-third of the anionic groups of the chromic sulphate has been replaced, this salt is said to be 33.3 percent basic. Similarly, if two of the $SO_4$ radicals are replaced, the compound is said to be 66.6 percent basic, $Cr_2(OH)_4SO_4$. Thus, chromic hydroxide, $Cr(OH)_3$, is said to be 100 percent basic as all of the $SO_4$ radicals have been replaced by hydroxyl radicals. As long as there are sufficient sulphate groups and the compound is soluble the Werner Complex compounds of this invention will form.

While the reaction of the method of this invention will take place under normal conditions, it has been ascertained that with the addition of heat and the use of dilute solutions of both the basic chromic sulphate and the fatty acid salts, there is a marked increase in percentage yield of the fatty acid chromic sulphate complex of this invention.

The complex compounds of this invention are formed in the hydrophobic phase of the reaction mixture and are removed from the reaction mixture by extraction with mineral spirits, which is a particular cut of petroleum consisting primarily of saturated, normal chain hydrocarbons. The complex may then be washed with water to remove any soluble salts remaining. Also, the water repelling compounds of this invention are soluble in common aliphatic solvents at room temperature.

The highly purplish color of the compounds of this invention is indicative of the complex formation. Also their solubility at room temperature in common aliphatic solvent is another indication. The conventional sulphate tests were positive in that they disclosed the presence of sulphates in the complex compound of this invention. It is of interest that the water repelling complex compounds of this invention, once affixed to the article to be rendered water repellent, are not soluble in their original solvent, for example mineral spirits; thus their permanent properties.

The fatty acid chromic sulphate compounds of this invention are excellent water repelling agents. As low as 0.5 gram per 100 mls. of solvent applied to articles of paper, leather, cement, cloth, wood, etc. imparts excellent permanent water repelling properties to the treated article.

The following examples are intended to illustrate the new process of the instant invention more fully, but are not intended to limit the scope of the invention, for it is possible to effect many modifications therein. In the examples, all parts and percents are by weight unless otherwise indicated.

EXAMPLE 1

To 39 mls. of N/2NaOH was added 5 grams of stearic acid. This solution was heated in a boiling water bath for 45 minutes with intermittent stirring. To this sodium stearate soluton was added 100 ml. of water and then brought to a boil. To 80 mls. of distilled water was added 6 mls. of stock chrome liquor, which was 33 percent basic and contained 16.7 grams of $Cr_2O_3$ per 100 mls. This solution was heated to boiling and then added rapidly with stirring to the boiling sodium stearate solution. Just prior to the completion of the addition, separation into two layers took place at once with the purplish basic chromic stearate sulphate complex sticking together in a mass and on the sides of the container. The water phase was poured off and 50 mls. of mineral spirits were added to the precipitate and heated which resulted in the complex dissolving in the hot mineral spirits.

EXAMPLE 2

In a solution of 100 mls. of mineral spirits and 4.38 grams of the compound produced in Example 1, having a purplish color, was placed a piece of white cotton twill cloth laundered several times. The twill was thoroughly soaked and removed from the solution and squeezed. The color of the cloth was purplish. The mineral spirits were allowed to evaporate from the cloth at room temperature. After 5 days a piece of the cloth, still purplish in color, was cut off and soaked in mineral spirits. The cloth was removed and no color was found in the mineral spirits and the piece of cloth still retained the purplish color. The purplish colored cloth was then placed in new mineral spirits and boiled for 3 minutes. The cloth was removed, dried and subjected to several baths of chloroform. After removal from the chloroform and being allowed to air dry, the cloth was still purplish in color, The cloth would float when placed in water and when water was poured on it, the water would ball up and run off leaving the cloth dry.

Thus, after the mineral spirit and chloroform washings, the basic chromic stearate sulphate complex was still fixed to the cloth and gave it water repellency—a permanent water repelling compound.

The same procedure as above was carried out on filter paper with the exception of a more dilute solution being used so that the filter paper did not acquire a purplish color. Further, no chloroform washing was performed. The filter paper was air dried for 5 days and then soaked in mineral spirits for one hour, removed from this mineral spirits, soaked again for one hour in fresh mineral spirits and then air dried. The paper retained excellent water repelling properties.

EXAMPLE 3

To 35 mls. of N/2NaOH was added 3 grams of decanoic acid. Enough water was added ot this solution to make 130 mls. This solution was heated to boiling with stirring.

To 6 mls. of 33 percent basic chrome sulphate stock solution was added 114 mls. of water and then the solution was heated to boiling and rapidly added with stirring to the boiling sodium decanoate. Separation into two phases took place, the complex forming one phase of a waxy, highly purplish colored compound which adhered to the stirring rod and sides of the container. The second phase was poured off and the basic decanoate chromic sulphate complex was dissolved in hot mineral spirits.

EXAMPLE 4

The exact procedure of Example 2 was followed except 1 gram of basic decanoate chromic sulphate was dissolved in 100 mls. of mineral spirits. White cotton twill cloth and fitler paper were user as in Example 2 and they repelled water as in Example 2.

Pieces of commercial cement blocks were soaked thoroughly in the above solution and air dried. These pieces of cement were then heated at 55° C. for 3 hours and then allowed to cool. They repelled water completely.

Thus from the above, cloth, paper and cement, once treated with the water repelent compound of this invention, acquire permanent water repelling characteristics. These compounds, once affixed to these articles, cannot be removed by the solvent in which they were originally soluble.

EXAMPLE 5

To 5 grams of cod liver oil, containing approximately 25 percent arachidonic acid, was added 28 mls. of N/2NaOH for saponification. This solution was heated to boiling for 45 minutes with stirring. To this sodium salt of the cod liver oil fatty acid was added 100 mls. of water and again brought to a boil.

To 80 mls. of distilled water was added 6 mls. of 33 percent basic chromic sulphate stock solution and then the solution was heated to boiling. It was added rapidly with stirring to the above boiling sodium salt solution of cod liver oil fatty acid. Separation into two phases occurred, with a waxy, highly purplish colored compound adhering to the stirring rod and sides of the container. The second phase was poured off and the complex was dissolved in 100 mls. of hot mineral spirits.

EXAMPLE 6

A solution of 4.4 grams of the basic chromic cod liver oil fatty acid sulphate complex produced in Example 5, and 100 mls. of mineral spirits was prepared.

A piece of white cotton twill cloth was soaked in this purplish colored soultion, removed and squeezed to remove the excess. The cloth, now colored highly purplish, was allowed to dry at room temperature. After 5 days, a piece of this cloth was immersed in mineral spirits. No purplish color was observed in the mineral spirits solution and the cloth retained the highly purplish color. The piece of cloth was then placed in fresh mineral spirits and heated to a boil and maintained at a boil for 3 minutes. The cloth was then subjected to several chloroform washings and then allowed to air dry. No color was observed in the chloroform wash liquid and the cloth retained a high purplish color. The cloth was allowed to dry at room temperature and then had water poured on it. The water did not soak into the cloth as it ran off. The thus treated cloth was then placed in a container of water and it floated.

Thus, after cleaning the cloth treated with the compound of this invention, it was observed that the cloth retained the water repelling properties imparted to it by the original treatment of the cloth by the compound of Example 5. It had acquired permanent water repelling properties.

Filter paper and commercial cement blocks were treated as above except with a much more dilute solution of the water repelling compound of this invention, 1 gram per 100 mls. of mineral spirits. Both the paper and the block were allowed to air dry. The cement block was then heated at 55° C. for about 3 hours, then cooled. When water was poured over the block, none appeared to penetrate. Upon soaking in water for several hours and then being removed from the water, there were no wet areas on the block. It now had excellent permanent water repelling properties.

EXAMPLE 7

A solution of 2.5 grams of stearic acid, 2.5 grams of oleic acid and 120 mls. water was prepared. To this solution was added 36.5 mls. of N/2KOH and then it was heated in a boiling water bath for 30 minutes.

A solution of 100 mls. of water and 6 mls. of 33 percent basic chromic sulphate stock solution was prepared and heated to boiling. This boiling solution was then added with stirring to the above heated solution of potassium stearate and potassium oleate.

Two phases formed and in one phase the complex chromic sulphate formed was waxy and highly purplish in color sticking to the stirring rod and the sides of the container. The liquid phase was poured off and the complex was dissolved in hot mineral spirits.

EXAMPLE 8

The exact procedure of Example 2 was followed and it was observed that cloth, paper and cement blocks, when treated with the compound of Example 7, had acquired permanent water repellency.

Thus, with a treatment of a wide variety of articles by the complex formed by the reaction of alkali metal salt of a fatty acid and a basic chromium sulphate, one can and is able to impart permanent water repellency properties to these articles.

It is understood that changes and variations may be made in the present invention by one skilled in the art without departing from the spirit and scope thereof as defined in the appended claims.

I claim:
1. A method for producing a permanent water repelling compound for many articles consisting of reacting a metal salt of a fatty acid, said salt being a member selected from the group consisting of the alkali metals, with basic chromic sulphate.

2. The method of claim 1 in which the fatty acids are a member selected from a group consisting of acids containing from 10 carbon atoms up to and around 25 carbon atoms.

3. The method of claim 1 in which the metal salts are a member selected from the group consisting of the alkali metal and the fatty acids are a member selected from a group consisting of acids containing from 10 carbon atoms up to and around 25 carbon atoms.

4. The method of claim 1 in which the metal salt is the sodium salt and the fatty acid is stearic acid.

5. The method of claim 1 in which the metal salt is the sodium salt and the fatty acid is decanoic acid.

6. The method of claim 1 in which the metal salt is the sodium salt and the fatty acid is cod liver oil acids.

7. The method of claim 1 in which the metal salt is the potassium salt and the fatty acid is a member selected from the group consisting of fatty acids containing from 10 carbon atoms up to and around 25 carbon atoms.

8. The method of claim 7 in which said metal is potassium and said acid is decanoic.

9. A complex compound formed as a reaction product of the mixing of chromium sulphate and an alkali metal salt of a fatty acid, the carbon chain of said acid containing from 10 to 25 carbon items, said compound being a coordination compound of the Werner type and being further characterized by being generally soluble at room temperature in common aliphatic solvents and insoluble in water, said compound also being capable of rendering objects with which the compound is treated water repellant.

10. The complex compound of claim 9 in which said fatty acid is stearic acid and the alkali metal is sodium.

11. The complex compound of claim 9 in which said fatty acid is decanoic acid.

12. The complex compound of claim 9 in which said fatty acid is cod liver oil acids.

13. The complex compound of claim 9 in which said fatty acid is a member selected from the group consisting of decanoic, stearic, arachidonic and mixtures thereof and the alkali metal is a member selected from the group consisting of sodium, potassium and mixtures thereof.

References Cited

Iler: "Industrial and Engineering Chemistry," vol. 46, No. 4 (1954), pp. 766–769 relied on.

Mellov's Modern Inorganic Chemistry, Revised Ed. by Parkes (1961), published by Longmans, New York, pp. 873–875 and 946–947 relied on.

ELBERT L. ROBERTS, Primary Examiner

U.S. Cl. X.R.

117—167; 260—18